US005768429A

United States Patent [19]
Jabbi et al.

[11] Patent Number: 5,768,429
[45] Date of Patent: Jun. 16, 1998

[54] APPARATUS AND METHOD FOR ACCELERATING DIGITAL VIDEO DECOMPRESSION BY PERFORMING OPERATIONS IN PARALLEL

[75] Inventors: Amandeep S. Jabbi, Mountain View; Chang-Guo Zhou, Cupertino, both of Calif.

[73] Assignee: Sun Microsystems, Inc., Palo Alto, Calif.

[21] Appl. No.: 562,674

[22] Filed: Nov. 27, 1995

[51] Int. Cl.$^6$ .................................................. G06K 9/36
[52] U.S. Cl. ........................................ 382/233; 382/232
[58] Field of Search ................................ 382/232–234, 382/248, 250–251, 238

[56] References Cited

U.S. PATENT DOCUMENTS

| | | | |
|---|---|---|---|
| 5,185,856 | 2/1993 | Alcorn et al. | 395/130 |
| 5,268,995 | 12/1993 | Diefendorff et al. | 395/122 |
| 5,504,823 | 4/1996 | Yoon | 382/233 |
| 5,533,185 | 7/1996 | Lentz et al. | 395/162 |
| 5,555,321 | 9/1996 | Ogura et al. | 382/235 |
| 5,598,483 | 1/1997 | Purcell et al. | 382/232 |

OTHER PUBLICATIONS

"i860™ Microprocessor Family," *Intel Microprocessors*, vol. II, 1991.

Bass et al., "The PA 7100LC Microprocessor: A Case Study of IC Design Decisions in a Competitive Environment," *Hewlett–Packard Journal*, Apr. 1995, vol. 46, No. 2, pp. 12–22.

Bass et al., "Design Methodologies for the PA 7100LC Microprocessor," *Hewlett–Packard Journal*, Apr. 1995, vol. 46, No. 2, pp. 23–35.

Lee et al., Real–Time Software MPEG Video Decoder on Multimedia–Enhanced PA 7100LC Processors, *Hewlett–Packard Journal*, Apr. 1995, vol. 46, No. 2, pp. 60–68.

Martin, "An Integrated Graphics Accelerator for a Low–Cost Multimedia Workstation," *Hewlett–Packard Journal*, Apr. 1995, vol. 46, No. 2, pp. 43–50.

Pearson, A Low–Cost, High Performance PA–RISC Workstation with Built–In Graphics, Multimedia, and Networking Capabilities, *Hewlett–Packard Journal*, Apr. 1995, vol. 46, No. 2, pp. 6–11.

Gwennap, Ultrasparc Adds Multimedia Instructions, *Microprocessor Report*, Dec. 1994, pp. 16–18.

Hung et al., "Statistical Inverse Discrete Cosine Transforms for Image Compression," *SPIE*, vol. 2187, Apr. 1994, pp. 196–205.

"A Central Processing Unit with Integrated Graphics Functions," U.S. Patent Application No. 08/236,572, filed Apr. 29, 1994, Van Hook et al.

Motorola, "MC88110 User's Manual, 2nd Generation RISC Microprocessor," 1991, Section 1, pp. 1.1 to 1.24; Section 3, pp. 3.1 to 3.32; Section 5, pp. 5.1 to 5.26.

*Primary Examiner*—Edward L. Coles, Sr.
*Assistant Examiner*—Stephen Brinich
*Attorney, Agent, or Firm*—Townsend and Townsend and Crew LLP

[57] ABSTRACT

A method and apparatus for fast and cost-effective digital video decompression is disclosed. The invention implements the inverse quantization, inverse discrete cosine transform and motion compensation functions for an MPEG decoder in a pipelined parallel processor. The IDCT and motion compensation functions are implemented to maximize parallelization by using partitioned arithmetic and logic operations in a superscalar microprocessor. This approach drastically reduces the total number of instruction cycles required to perform the IDCT and motion compensation functions.

10 Claims, 7 Drawing Sheets

APPARATUS AND METHOD FOR ACCELERATING DIGITAL VIDEO DECOMPRESSION BY PERFORMING OPERATIONS IN PARALLEL

COPYRIGHT NOTICE

A portion of the disclosure of this patent document contains material which is subject to copyright protection. The copyright owner has no objection to the xeroxographic reproduction by anyone of the patent document or the patent disclosure in exactly the form it appears in the Patent and Trademark Office patent file or records, but otherwise reserves all copyright rights whatsoever.

APPENDICES

Appendix A is a copy of a preliminary draft (Oct. 4, 1995) of the "Visual Instruction Set User's Guide," for the UltraSPARC-I superscalar processor developed by Sun Microsystems, Inc.

RELATED APPLICATIONS

The present invention is related to U.S. Patent application Ser. No. 08/236,572 by Van Hook et al., filed Apr. 29, 1994, entitled "A Central Processing Unit with Integrated Graphics Functions," as well as U.S. Patent application Ser. No. 08/398,111, (Atty Dckt No. P-1867) by Chang-Guo Zhou et al., filed Mar. 3, 1995, entitled "Color Format Conversion in a Parallel Processor," both of which are incorporated in their entirety herein by reference for all purposes.

BACKGROUND OF THE INVENTION

The present invention relates in general to digital image processing, and in particular to a method and apparatus for high speed digital video decompression.

Digital video encoding and compression techniques have been developed to dramatically improve the efficiency in image data storage and processing. Taking advantage of redundancies inherent in natural imagery, image data encoding and compression allow for faster transmission of images, lower power consumption by the transmitter, and more compact image storage.

There are currently two standards established by the Moving Pictures Experts Group (MPEG1 and MPEG2) that define the compression algorithm for video, audio, and system bitstream. MPEG1 addresses compressed video bitstream of typically between 0.5 to 1.8 MB/s, while MPEG2 deals with the faster rates of typically 4 to 9 MB/s. While the exemplary values used herein reflect the MPEG1 standard, the techniques and methods of the present invention apply to MPEG2 as well as future MPEG standards. Thus, the broader terminology MPEG is used herein to encompass all MPEG based protocols. The MPEG video compression algorithm is based on discrete cosine transform (DCT) and inter-frame motion compensation (see, ISO/IEC JTC1/SC29/WG11, Information Technology—Coding of Moving Pictures and Associated Audio for Digital Storage Media). By removing the high spatial and temporal redundancies existing in motion video pictures, MPEG techniques can compress digital movies with high video quality at compression ratios, for example, from 35 to 140, i.e., reducing, for example, 21 MB/s video data to about 150–600 kB/s.

The decoding of the MPEG compressed video data involves four basic operations performed by the following four functional blocks: 1) Bitstream parser and variable decoder; 2) Dequantization and inverse DCT; 3) Motion compensation; and 4) YUV to RGB color conversion. A quantitative estimate of the complexity of the general MPEG video real-time decoding process in terms of the number of required instruction cycles per second reveals that, for a typical general-purpose RISC processor, all of the resources of the microprocessor are exhausted by, for example, the color conversion operation alone. Real-time decoding refers to decoding at the rate at which the video signals were originally recorded, e.g., 30 frames per second.

An exemplary digital television signal generates about 10.4 million picture elements (pixels) per second. Since each pixel has three independent color components (primary colors: red, green, and blue), the total data element rate is more than 30 million per second, which is of the same order of magnitude as current CPU clock speeds. Thus, even at the highest current CPU clock speed of 200 MHz, there are only 20 clock cycles available for processing each pixel, and less than 7 clocks per color component.

To convert the video signals of a digital television signal from YUV to RGB format in real time, for example, using even the fastest conventional microprocessors requires approximately 200 million instruction cycles per second, i.e., nearly all of the data processing bandwidth of such a microprocessor. Depending on the type of processor used and several other factors such as bit rate, average symbol rate, etc., implementing each of the inverse DCT function and motion compensation in real time may require, for example, anywhere from approximately 90 million operations per second (MOPS) to 200 MOPS for full resolution images. Existing general-purpose microprocessors are extremely inefficient in handling real-time decompression of full-size, digital motion video signals compressed according to MPEG standards. Typically, additional hardware is needed for such real-time decompression, which adds to system complexity and cost.

There is therefore a need for a more efficient implementation of real-time decompression of digital motion video compressed according to MPEG standards.

SUMMARY OF THE INVENTION

The present invention provides a fast, and highly cost-effective approach to real-time video decompression whereby the inverse discrete cosine transform and motion compensation functions are implemented using a specially developed instruction set in a parallel processing environment that maximizes parallelization of operations. The graphics data partitioned addition and multiplication instructions allow for simultaneous addition or multiplication of multiple words of graphics data in parallel using a number of processing sub-units of a graphics execution unit.

Accordingly, in one embodiment, the present invention provides a method for performing an inverse discrete cosine transform (IDCT) function in a computer system having multiple processing sub-units operating in parallel. The method includes the steps of loading multiple IDCT base transform coefficients into various segments of a partitioned register and loading multiple scaling factors into the segments of another partitioned register. Next, a partitioned multiplication operation between the IDCT base transform coefficients and the scaling factors is executed in parallel to obtain scaled IDCT coefficients in partitioned format. This is followed by a step of accumulating the scaled IDCT coefficients into a set of initialized partitioned registers. This process is repeated until the IDCT for a block of data is completed.

In another embodiment, the present invention provides a method for performing motion compensation whereby based on a motion vector and half pixel flags, the arrangement of the image data is manipulated into appropriate format to perform a partitioned addition with the results of the IDCT operation. The manipulation of the image data involves performing various partitioned operations such as data aligning and expanding. Each partitioned segment includes one data element, allowing multiple data elements to be operated on in parallel.

A better understanding of the nature and advantages of the present invention is gained by reference to the detailed description and the drawings below.

DESCRIPTION OF SPECIFIC EMBODIMENTS

Figure 1:
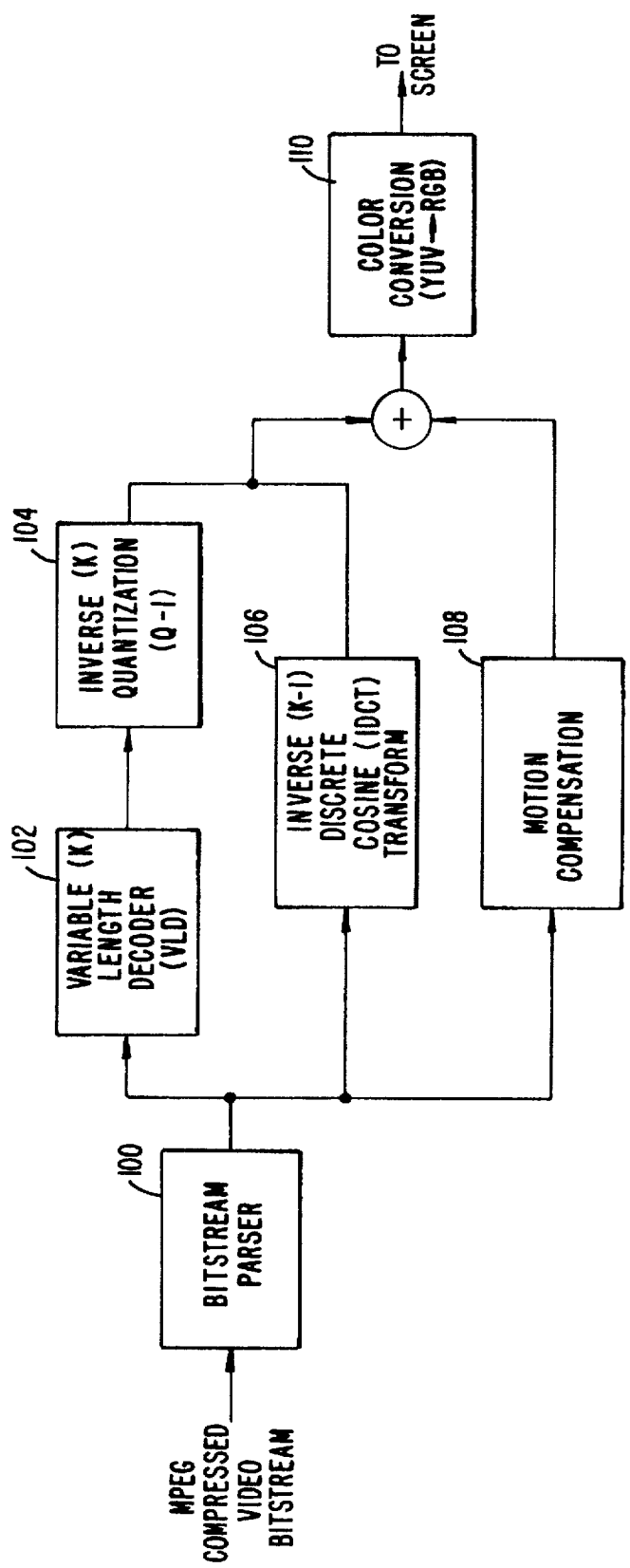
FIG. 1 is a block diagram showing the functional blocks for a typical MPEG decoder.

Referring to FIG. 1, there is shown the functional blocks implementing an MPEG decoder according to the present invention. A bitstream parser 100 receives the bitstream, identifies headers and parses the bitstream to determine various parameters such as the resolution and bit rate for the received bitstream. A variable length decoder (VLD) 102 receives the output of bitstream parser 100 serially. VLD 102 successively decodes 8×8 blocks of pixels based on the tables in the MPEG standard. An inverse quantization block 104 dequantizes the variable length decoded data. In parallel with the VLD and inverse quantization operations, 8×8 blocks of data are processed by an inverse discrete cosine transform (IDCT) block 106. The 8×8 blocks are also supplied to a motion compensation (MC) block 108. The outputs of IDCT 106 and MC 108 are summed together to generate a YUV frame (luminance/chrominance signals). The YUV frame goes through a color conversion block 110 that converts the YUV frame to an RGB frame (Red/Green/Blue destination format) to be displayed on the screen.

This arrangement optimizes the decoder performance for a pipelined parallel processing environment. As will be described in connection with FIGS. 7 and 8, the microprocessor that implements the MPEG decoder preferably includes an integer execution unit operating in parallel with a floating point/graphics execution unit in a pipelined architecture. This allows the VLD and inverse quantization functions to be processed in the integer execution unit, while simultaneously processing the IDCT function in parallel in the graphics execution unit. Throughput is further maximized by a pipelined architecture that simultaneously processes the IDCT for the (k-1)th non-zero DCT coefficient and the VLD and inverse quantization for the kth non-zero DCT coefficient.

Of the various computational blocks of the MPEG decoder shown in FIG. 1, bitstream parser 100, VLD 102 and inverse quantization block 104 process the data sequentially, and therefore do not lend themselves to parallelization. Motion compensation 108 and color conversion 110 operations, however, are highly parallel in nature, and depending on the implementation, IDCT block 106 may also have a high degree of parallelism. The above mentioned U.S. Patent application, Ser. No. 08/398,111 (Atty Dckt No. P-1867) by Chang-Guo Zhou et al., describes a method and apparatus that take advantage of the parallelism in the color conversion function (block 110) to dramatically reduce the number of instructions per pixel. Further enhancements in speed and efficiency of the MPEG decoder is achieved by parallelizing the IDCT and motion compensation functions according to the method and apparatus of the present invention as described below.

Image compression techniques apply the discrete cosine transform (DCT) to image and image sequences to decorrelate the picture before quantization. This decorrelation results in many of the quantized transform coefficients equaling zero, hence the compression gain. For the decoder, the very few, sparsely populated, non-zero transform coefficients can be utilized for great speed-up in the inverse DCT (IDCT). There are various approaches to compute the IDCT. Forward-mapping IDCT as proposed by McMillan and Westover in "A forward-mapping realization of the inverse discrete cosine transform," data compression conference 1992, pp. 219–228, is one example. Other examples are discussed by Hung and Meng in "Statistical Inverse Discrete Cosine Transforms for Image Compression," 1994, SPIE Vol. 2187. The computations involved in many of these approaches typically require a number of additions and multiplications. The forward-mapping IDCT, for example, requires a scaling of what McMillan and Westover refer to as a set of kernels (basis matrices) by the transform coefficient for a given location, and then summing the scaled kernels. The weighted kernels for each non-zero DCT coefficient are added together to obtain 64 values for the spatial domain function. The forward-mapping IDCT requires 64 additions and no more than 10 multiplications per non-zero coefficient Typically, the kernels are precomputed for all DCT coefficients and made available in a table for IDCT processing.

Figure 2:
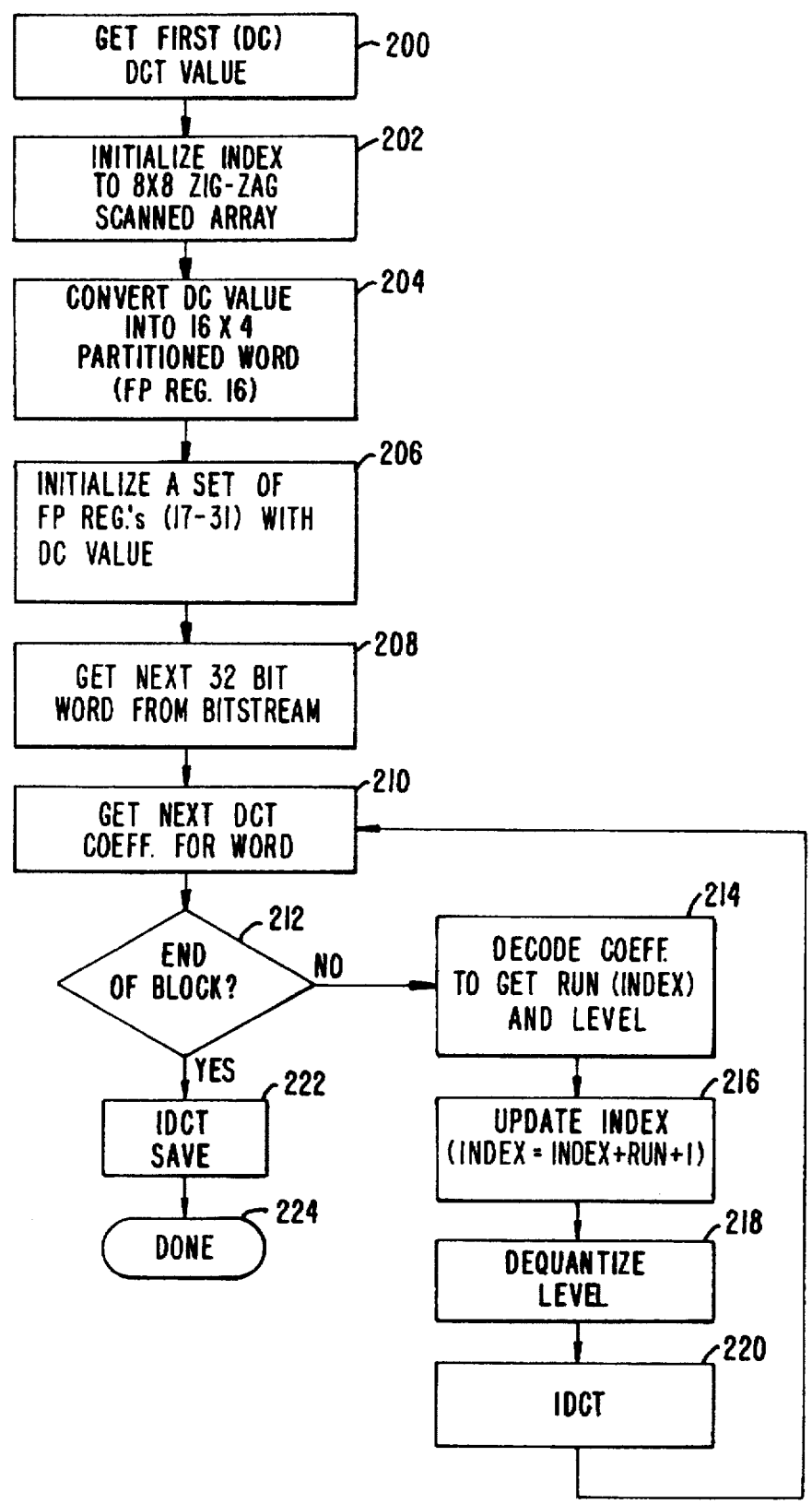
FIG. 2 is a logic flow diagram showing part of an exemplary implementation of the IDCT block according to the present invention.
Figure 3:
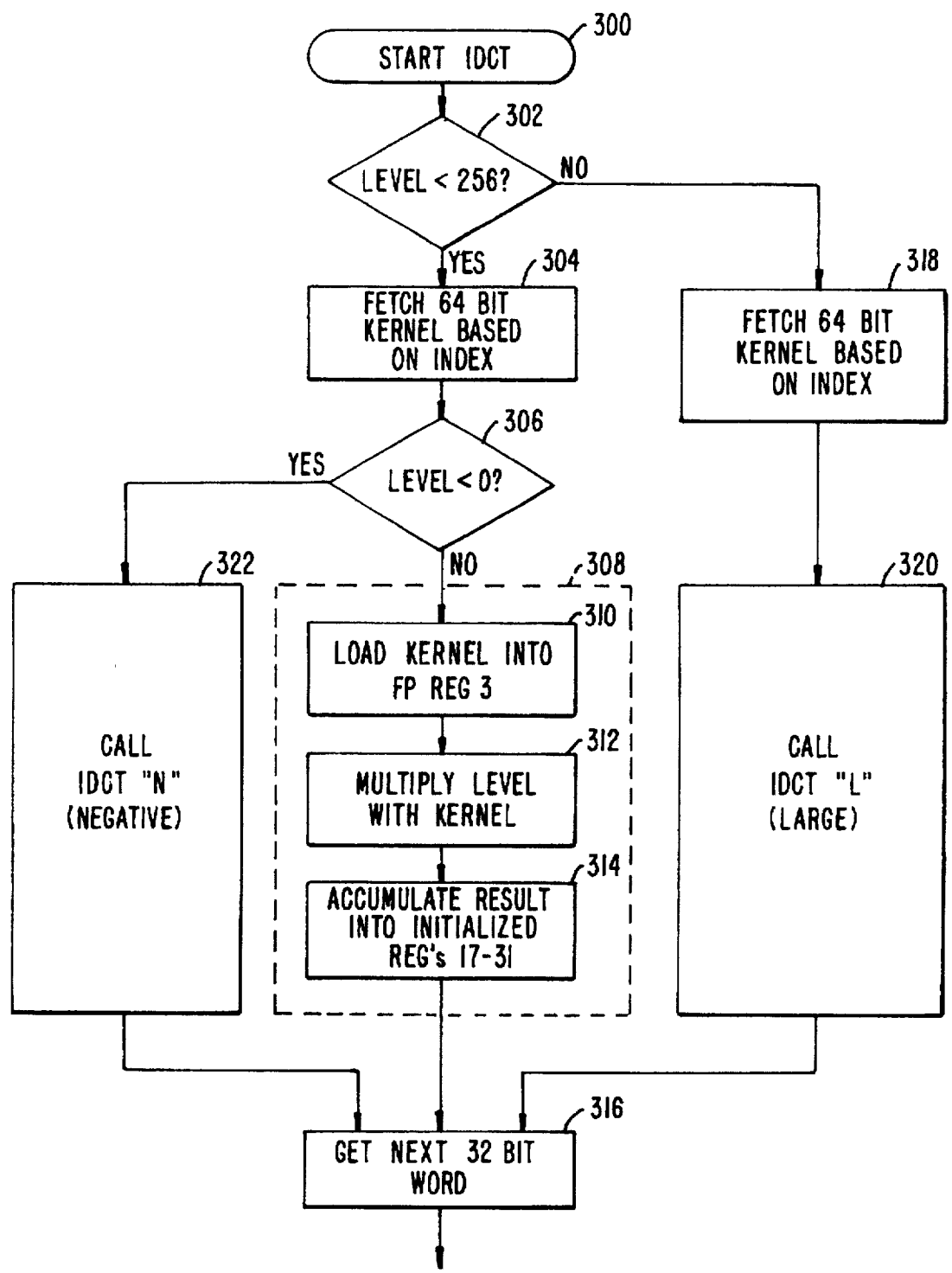
FIG. 3 is a logic flow diagram showing another portion of the exemplary implementation of the IDCT block according to the present invention.
Figure 4:
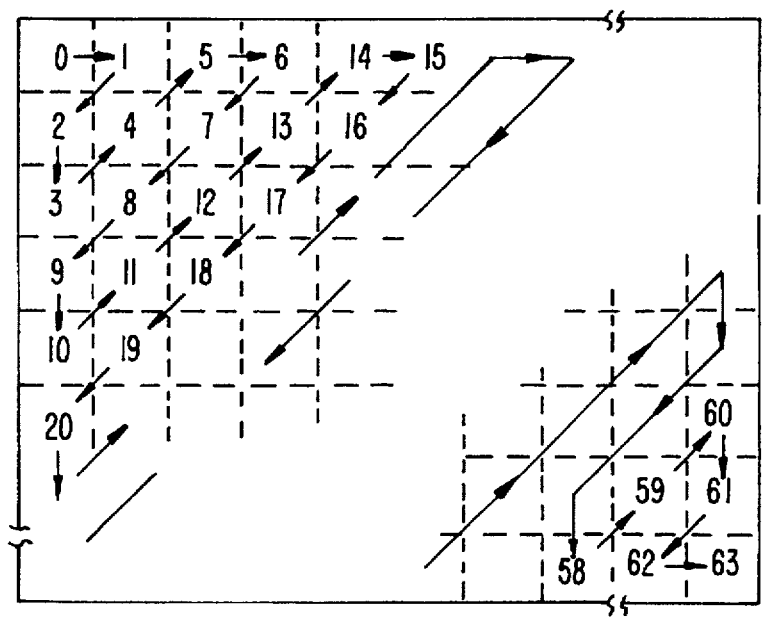
FIG. 4 shows an 8×8 block of data that is in the form of a zig-zag scanned array.

FIGS. 2 and 3 are logic flow diagrams that show the IDCT method of the present invention at a high level. After parsing the bitstream, quantized DCT values appear serially in the bitstream. The order in which these values appear in the bitstream for an 8×8 block of data is shown in FIG. 4. Locations 0 to 63 are scanned in a zig-zag array. The first quantized DCT value in location 0 is defined as the DC value, while the remaining 63 values are called the AC values. Referring to the flow diagram of FIG. 2, the first step 200 is to get the first (DC) DCT value. Next, at step 202, the index that defines the spatial location of a particular value in the 8×8 zig-zag scanned array is initialized to zero to indicate the start of the array.

The DC value is next converted into a 4×16 (32-bit) partitioned word at step 204. In the partitioned format, a 32-bit or 64-bit word includes multiple word components. The partitioned data format facilitates partitioned arithmetic operations on several variables in parallel. For example, a 4×16 partitioned word includes four 16-bit signed fixed point values that may represent the result of a partitioned multiplication. A 4×8 (32-bit) partitioned word may include four 8 bit unsigned integers that may represent intensity values for an image (e.g., R, G, B, and α). In another example, an 8×8 (64-bit) partitioned word may include eight 8-bit values representing two pixels.

Referring back to FIG. 2, at the next step 206, a set of floating point double (64-bit) registers are initialized with the DC value. Then the next 32-bit word in the bitstream is fetched at step 206. Next, at step 210, the DCT coefficient for the word is retrieved from the VLD tables. Before performing run-level decoding on the coefficient, the routine checks whether the end of block has been reached at step 212. If not, the coefficient is decoded at step 214 to obtain the run and level information. Next, the index is updated to point to the new location based on the run information. At step 218, the coefficient level is dequantized (inverse quantization block 104 in FIG. 1) after which the IDCT process can begin. Note that this diagram does not illustrate the pipelined nature of the microprocessor. That is, steps 214 and 218 (VL decoding and inverse quantizing) process the next DCT coefficient while IDCT 220 processes the current DCT coefficient.

FIG. 3 is a logic flow diagram showing the IDCT operation. The valid range of values for a dequantized DCT coefficient is from −1024 to 1023 (11 bit value). The present invention divides the range of values for the input to IDCT into three separate sub-ranges: a negative (N) range from −1024 to −1, a positive (P) range from 0 to 255, and a large (L) range from 256 to 1023. This division optimizes the utilization of the registers for the partitioned arithmetic operations. Values in the negative range (−1024 to −1), for example, are partitioned into four signed 16-bit word components inside a 64-bit double register. Values in the positive range (0 to 225) are partitioned into eight 8-bit word components inside a 64-bit double register. Values in the large (256 to 1023) range are partitioned into four 16-bit word components inside a 64-bit double register.

At the start of the IDCT routine, the dequantized level is checked to determine its range. If the level is smaller than 256, then at step 304, based on the index, four 16-bit kernel entries are fetched from the IDCT kernel tables. The IDCT kernel tables contain precomputed kernels for all values of each coefficient in the 8×8 block based on the forward-mapping IDCT equation, or some variation thereof. Next, at step 306, the level of the coefficient is checked once again to determine whether it falls in the negative range or the positive range. If the level is positive, the IDCT "P" routine 308 is called.

As discussed above, the IDCT is computed by summing weighted kernels for non-zero DCT coefficient. Thus, the four 16-bit kernels are loaded into a 64-bit floating point double register (FPreg. 3) at step 310. The scaling of the kernels is done by a partitioned multiplication of the kernels inside the 64-bit (4×16) register and the coefficient levels loaded inside a 32-bit (4×8) floating point register (FPreg. 0) at step 312. As will be described in connection with FIG. 6, this partitioned multiplication allows for four values to be multiplied concurrently, which cuts down the number of multiplication operations by a factor of four. Next, the result of the partitioned multiplication is accumulated into the initialized set of registers (regs. 17–31) at step 314. The accumulation step 314 is also performed by a partitioned add operation. After the accumulate step, the next 32-bit word is fetched from the bitstream and the cycle is repeated from step 210 ("get DCT coeff. for word") in FIG. 2. This process continues until the index reaches 63 indicating the end of block.

The IDCT large 322 and IDCT negative 320 routines involve similar operations to that of IDCT positive 308 with minor variations. In the case of IDCT negative, the accumulate step is performed by a partitioned subtraction operations. In the case of IDCT large, there are two partitioned multiplications and two partitioned additions performed for each coefficient. At the end of the IDCT process, the final IDCT values for an 8×8 block are all stored in the 16 64-bit (4×16) registers (FPreg. 16–31), with each register containing four IDCT values.

Once the IDCT values are determined, they are summed with the output of the motion compensation block 108 to obtain the YUV frame. The implementation of the motion compensation block according to the present invention is described hereinafter. Motion compensation generally refers to an image encoding procedure whereby when an image moves on the screen, instead of transmitting data that represents the entire image at its new location, only a motion vector is calculated and transmitted. This minimizes the amount of data since the image need not be reproduced and transmitted, only its new location. The basic element of information in MPEG decoding is an 8×8 block of data. Six 8×8 blocks form a macro block, where four 8×8 blocks represent pixel luminance, an 8×8 block represents pixel chrominance red and another 8×8 block represents pixel chrominance blue. Motion compensation basically operates on macro blocks and may involve forward and backward moving frames with possible half pixel interpolations. There are four cases for half pixel interpolation for both forward and backward frames: (i) horizontal direction (10); (ii) vertical direction (01); (iii) both vertical and horizontal directions (11); and (iv) no interpolation (00). The primary operations for motion compensation involve manipulating the variable length decoded block of data into a format that is to be subsequently summed with the IDCT output. This process translates source frame to destination frame. The main operations in the implementation according to the present invention include data aligning, accumulating, and expanding.

Figure 5:
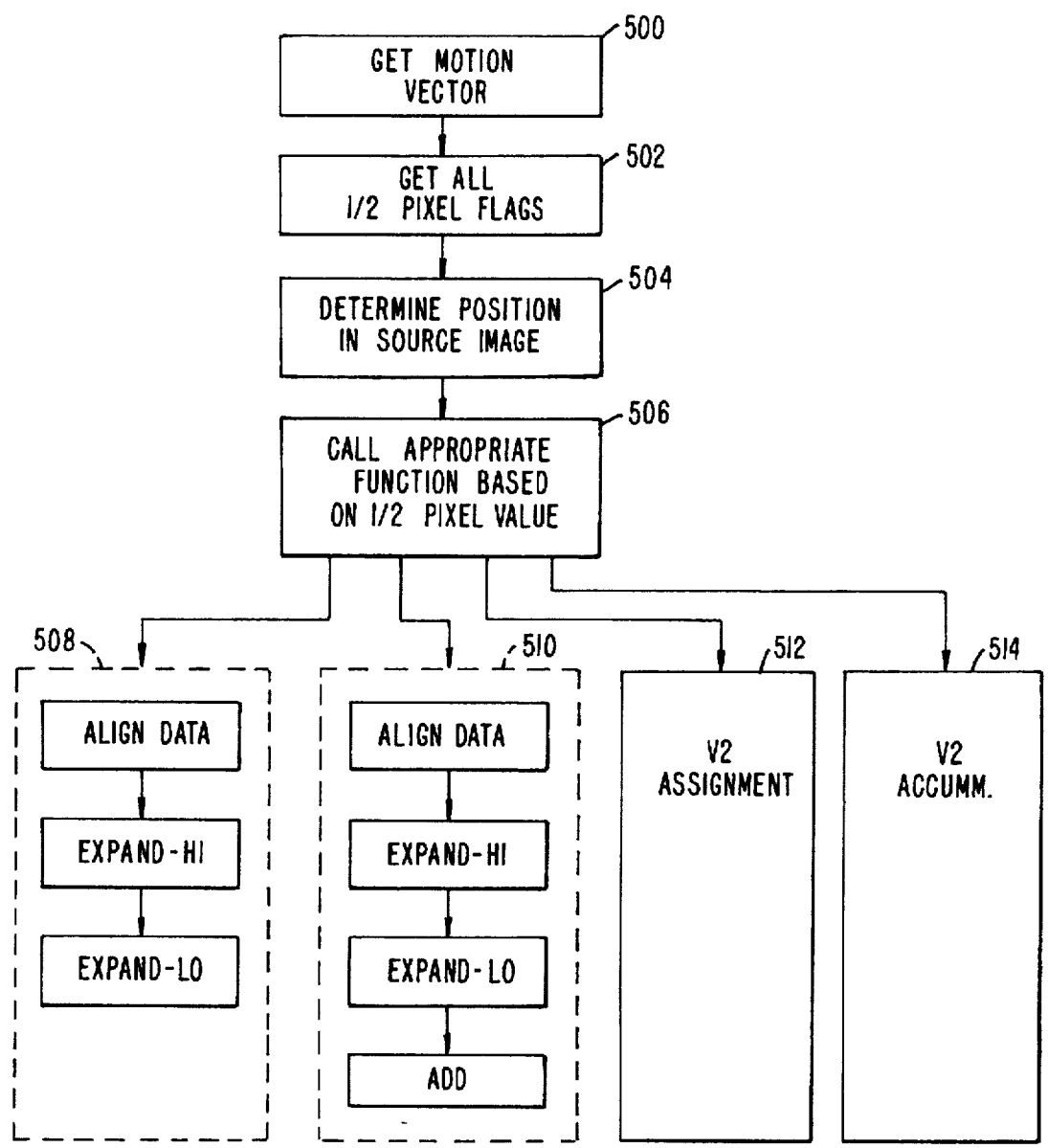
FIG. 5 is a logic flow diagram showing a simplified exemplary implementation of the motion compensation block according to the present invention.

FIG. 5 is a highly simplified logic diagram showing part of the motion compensation process according to the exemplary implementation of the present invention. At step 500, the motion vector is fetched, followed by the step of getting all half pixel flags that define the type of interpolation. Next, the pixel position in the source image is determined at step 504. Based on the half pixel information, one of four routines is called to arrange the data into the appropriate format for summation with the IDCT output. These routines called H1 assignment (508) and accumulate (510), and V1 assignment (512) and accumulate (514), perform the data manipulation. The essential advantage in implementing motion compensation according to the exemplary embodiment of the present invention is in the fact that the various operations in the routines, including data aligning, adding and expanding are performed with single partitioned operations. Each partitioned segment contains one data element, allowing multiple (in this case up to four) data elements to be operated on in parallel. The same is true for the final summing operation performed on the outputs of the motion compensation block and IDCT block. That is, the IDCT save step 222 in FIG. 2 which is performed once a 8×8 block is fully transformed involves a partitioned add operation.

Figure 6:
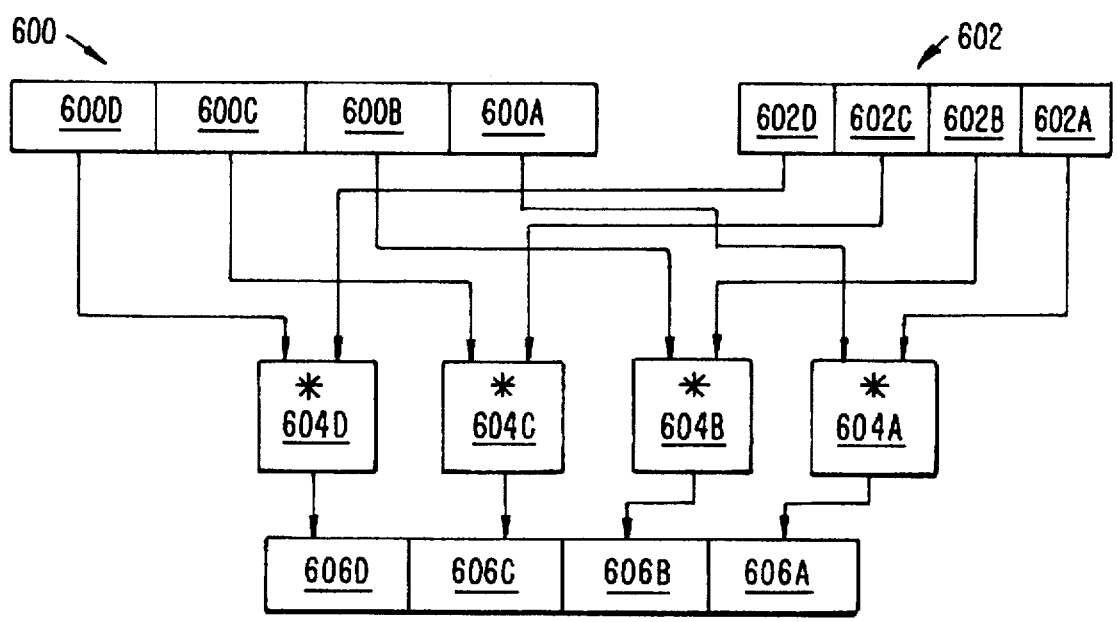
FIG. 6 illustrates one example of a partitioned operation according to the present invention.

One example of a partitioned operation according to the present invention is show in FIG. 6. FIG. 6 illustrates the process of scaling the forward-mapping IDCT kernels by the decoded coefficient levels as required by the IDCT process according to the embodiment of the present invention described above. A floating point register 600 is partitioned into a number of segments. In the exemplary embodiment shown in FIG. 6, register 600 is 64 bits wide and is partitioned into four 16-bit segments 600A–D. Four 16-bit kernels are loaded into the four 16-bit segments 600A–D of register 600, respectively. A second 32-bit wide floating point register 602 is partitioned into four 8-bit segments 602A–D. Four 8-bit decoded DCT coefficient levels are loaded into the four 8-bit segments 602A–D of register 602, respectively.

Each of segments 600A–D and 602A–D couple to respective inputs of processing sub-units 604A–D. Processing sub-units 604A–D are included in a graphics execution unit (not shown in FIG. 6) of the central processing unit (also not shown in FIG. 6), all of which are briefly described below in connection with FIGS. 7 and 8, and are further described in greater detail in the above-referenced U.S. Patent application Ser. No. 08/236,572 by Van Hook et al. Processing sub-units 604A–D operate in a multiplication mode simultaneously and in parallel to multiply data stored in register 600 by data stored in register 602 in a partitioned multiplication operation. The results of the multiplication are stored in respective 4×16 partitioned segments 606A–D of a 64-bit wide register 606 that respectively couple to the outputs of the processing sub-units 604A–D. Thus, four kernels are scaled in parallel.

Other partitioned operations performed by the graphics execution unit include partitioned add and subtract, data alignment, merge, expand and logical operations that are performed in one cycle, and partitioned multiplication, compare, pack and pixel distance operations that are performed in three cycles. These partitioned operations are described in detail in "Visual Instruction Set User's Guide," a publication by Sun Microsystems, Inc., attached herein as Appendix A.

Figure 7:
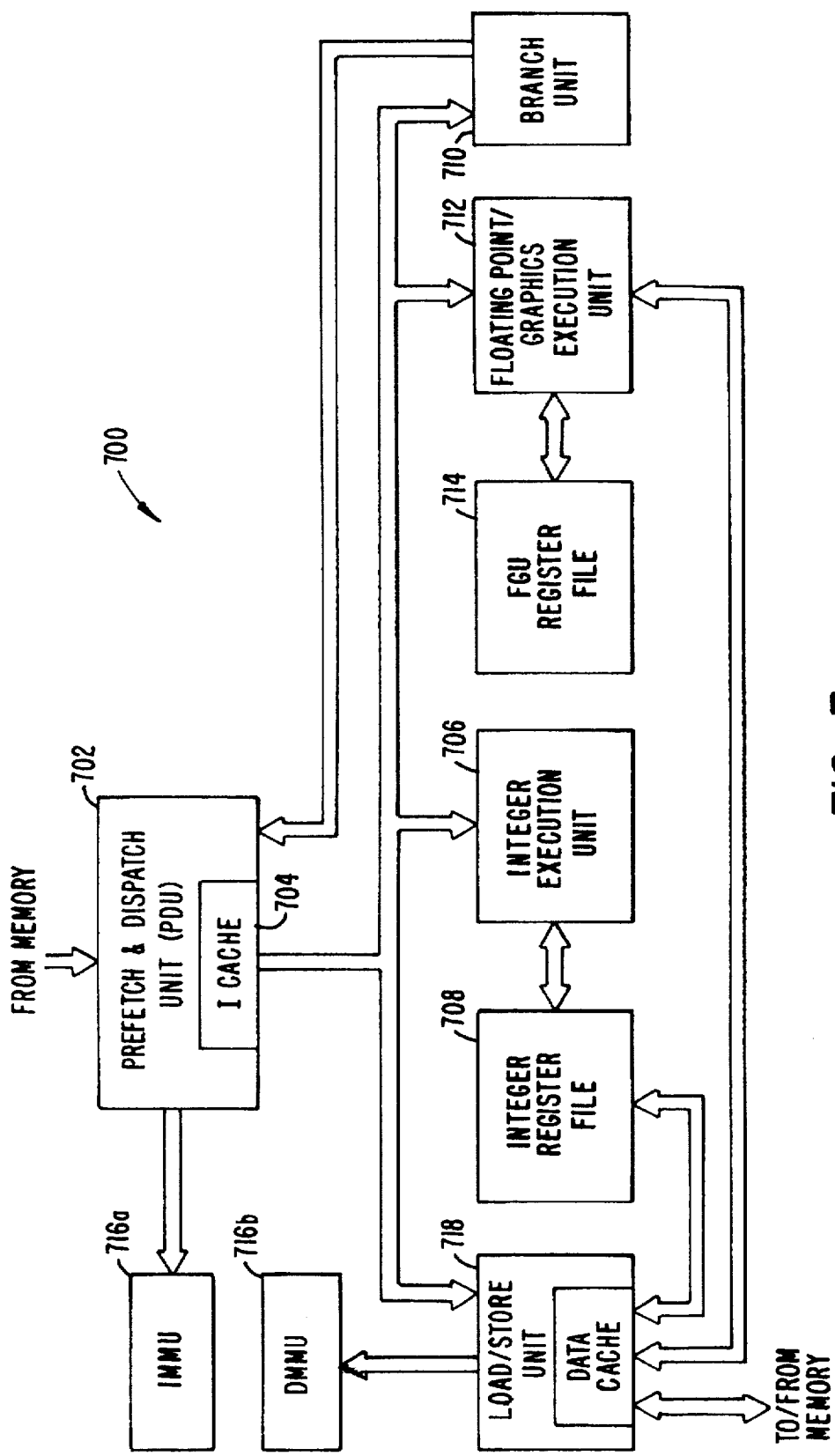
FIG. 7 is a block diagram of a central processing unit (CPU) of an exemplary graphics computer system that is capable of supporting the various embodiments of the present invention.

Further enhancements and speed-up in the operation of MPEG decoder is achieved by using a superscalar processor where more than one instruction is processed in each cycle. FIG. 7 is a block diagram of a central processing unit (CPU) 700 of an exemplary graphics computer system that is capable of supporting the various embodiments of the present invention. The UltraSPARC-I microprocessor developed by Sun Microsystems, Inc. is used herein as the exemplary graphics computer system. The UltraSPARC-I is a highly integrated superscalar 64-bit processor that includes a special graphics execution unit, the details of which are the subject of the above-referenced U.S. Patent application Ser. No. 08/236,572 by Van Hook et al. A brief description of the relevant portions of the UltraSPARC-I processor is provided below for a better understanding of the various embodiments of the present invention. It is to be understood, however, that the present invention is not limited to any particular computer architecture or operating system.

Referring to FIG. 7, CPU 700 includes a prefetch and dispatch unit (PD) 702 which includes an instruction cache 704, an integer execution unit (IEU) 706 coupled to an integer register file 708, a branch unit 710, a floating point/graphics execution unit (FLU) 712 coupled to a floating point/graphics (FLU) register file 714 coupled to each other as shown. CPU 700 further includes two memory management units (IMMU and DMMU) 716a and 716b, and a load and store unit (LSU) 718 with a data cache 720, coupled to each other as shown. Together they fetch, dispatch, execute in parallel (e.g., up to four instructions), and save execution results of instructions, including graphics instructions, in a pipelined manner.

Figure 8:
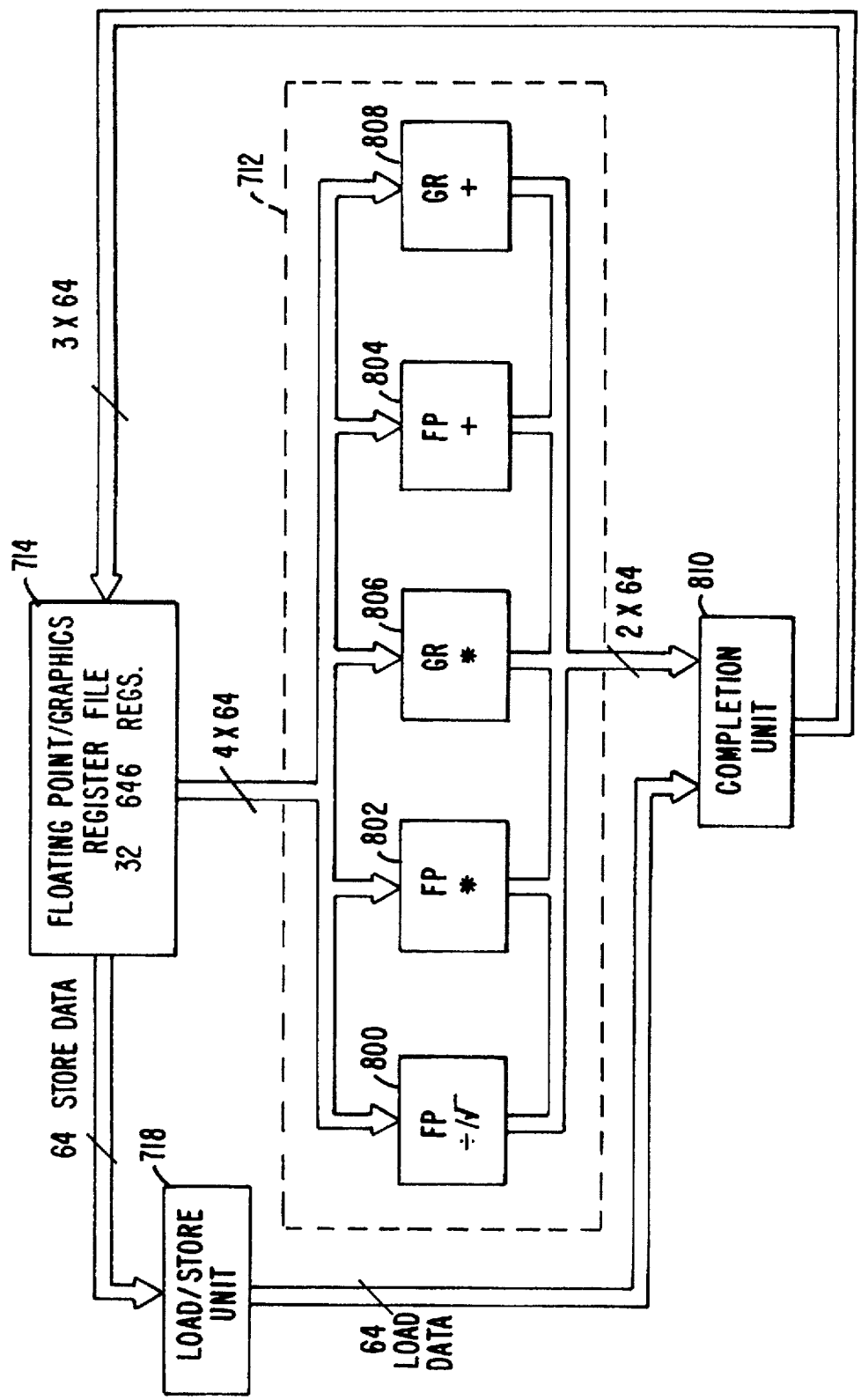
FIG. 8 is a block diagram of one embodiment of a graphics execution unit for use in the CPU of FIG. 6.

FIG. 8 is a block diagram of the floating point/graphics execution unit (FLU) 712. FLU register file 714 is shown as having 32 64-bit registers. FLU 712 includes three floating point and two graphics functional units which may operate in parallel. A floating point divider 800, a floating point multiplier 802, and a floating point adder 804 perform all the floating point operations. A graphics multiplier (GRM) 806 and a graphics adder (GRA) 808 perform all the graphics operations. GRA 808 performs single cycle partitioned add and subtract, data alignment, merge, expand and logical operations. Four 16-bit adders (not shown) are utilized and a custom shifter (also not shown) is implemented for byte concatenation and variable byte-length shifting. GRM 806 performs three cycle partitioned (four 16-bit word components) multiplication as depicted in FIG. 6, as well as, compare, pack and pixel distance operations. Four 8-bit pixel subtraction, absolute values, additions and a final alignment are required for each pixel distance operation.

FIG. 8 also shows the load and store unit 718 that operates in parallel with FLU 712. The load and store unit 718 executes all instructions that transfer data between memory hierarchy and the integer and floating point/graphics register files 708 and 714. This architecture allows two floating point/graphics operations and one floating point load/store operation to execute in one cycle. The parallel execution of a fourth integer or branch instruction (FIG. 7) allows CPU 700 to execute in parallel four instructions per cycle to substantially enhance its throughput. All operations, except for divide and square root, are fully pipelined In conclusion, the present invention provides a method and apparatus for a fast and cost-effective implementation of the IDCT and motion compensation functions of an MPEG decoder. The IDCT and motion compensation functions are implemented to maximize parallelization by using partitioned arithmetic and logic operations in a superscalar microprocessor. This approach drastically reduces the total number of instruction cycles required to perform the IDCT and motion compensation functions. While the above is a complete description of the preferred embodiment of the present invention, it is possible to use various alternatives, modifications and equivalents. For example, the inverse quantization matrices can be taken into account when generating the kernel tables for all nonzero DCT coefficients. By incorporating the inverse quantization matrices into a larger table, further parallelization and therefore increase in the throughput of the processor can be realized. Since this would result in considerably larger tables, a larger external cache would be typically required. The scope of the present invention should therefore be determined not with reference to the above description but should, instead, be determined with reference to the appended claims, along with their full scope of equivalents.

What is claimed is:

1. In a computer system which includes a plurality of processing sub-units operating in parallel, a method for decompressing video bitstream comprising the steps of:

(A) parsing the bitstream to identify bitstream parameters and to divide the bitstream into blocks of data;

(B) performing motion compensation on said blocks of data;

(C) decoding said blocks of data using a variable length (VL) decoder to obtain VL decoded data;

(D) performing inverse quantization on said VL decoded data to obtain dequantized data; and (E) transforming said dequantized data using an inverse cosine discrete transform (IDCT) function, wherein, said step of transforming comprises machine executed partitioned multiplication and addition operations that process a plurality of word components in parallel.

2. The method of claim 1 wherein said transforming step comprises the steps of:

(i) loading a plurality of IDCT base transform coefficients into a corresponding plurality of segments in a first partitioned register;

(ii) loading a plurality of scaling factors into a corresponding plurality of segments in a second partitioned register;

(iii) coupling said plurality of segments in said first and second partitioned registers to a corresponding plurality of the processing sub-units; and (iv) executing a partitioned multiplication operation between said plurality of IDCT base transform coefficients and said scaling factors in parallel.

3. The method of claim 2 wherein said transforming step further comprises the steps of:

(v) loading a result of said partitioned multiplication operation into a third plurality of partitioned registers;

(vi) executing a partitioned add operation between contents of said third plurality of partitioned registers and contents of a fourth plurality of initialized partitioned registers; and (vii) fetching a next plurality of IDCT base transform coefficients, and repeating steps (i) through (vi).

4. The method of claim 3 further comprising the steps of:

(F) summing a result of said motion compensating step with contents of said third plurality of partitioned registers to generate a YUV frame of data; and (G) converting said YUV frame into a color RGB frame for display on a video screen.

5. The method of claim 1 wherein said step of motion compensating comprises the steps of:

(i) receiving a motion vector and half pixel flags;

(ii) determining position in source image; and (iii) rearranging data in a format suitable for a partitioned add operation with said contents of s aid third plurality of partitioned registers.

6. The method of claim 5 wherein said rearranging step further comprises the steps of aligning and expanding said data using partitioned operations.

7. A method of performing an inverse discrete cosine transform (IDCT) function in a computer system having a plurality of processing sub-units operating in parallel, said method comprising the steps of:

(A) loading a plurality of IDCT base transform coefficients into a corresponding plurality of segments in a first partitioned register;

(B) loading a plurality of scaling factors into a corresponding plurality of segments in a second partitioned register;

(C) coupling said plurality of segments in said first and second partitioned registers to a corresponding plurality of the processing sub-units;

(D) executing a partitioned multiplication operation between said plurality of IDCT base transform coefficients and said scaling factors in parallel;

(E) loading a result of said partitioned multiplication operation into a third plurality of partitioned registers;

(F) executing a partitioned add operation between contents of said third plurality of partitioned registers and contents of a fourth plurality of initialized partitioned registers; and (G) fetching a next plurality of IDCT base transform coefficients, and repeating steps (A) through (F).

8. A computer program product having a computer usable medium including a computer readable code embodied therein for causing decompression of compressed digital video, said computer program product comprising:

computer readable program code devices configured to parse a bitstream of compressed digital video to identify bitstream parameters and to divide the bitstream into blocks of data;

computer readable program code devices configured to motion compensate said blocks of data;

computer readable program code devices configured to decode said blocks of data using a variable length (VL) decoder to obtain VL decoded data;

computer readable program code devices configured to perform inverse quantization on said VL decoded data to obtain dequantized data; and computer readable program code devices configured to transform said dequantized data using an inverse cosine discrete transform (IDCT) function, wherein, said IDCT function comprises machine executed partitioned multiplication and addition operations that process a plurality of word components in parallel.

9. In a computer system which includes a plurality of processing sub-units operating in parallel, a method for decompressing video bitstream comprising the steps of:

(A) parsing the bitstream to identify bitstream parameters and to divide the bitstream into blocks of data including a first data block and a second data block subsequent to said first data block;

(B) performing motion compensation on said first data block and said second data block;

(C) decoding said first data block using a variable length (VL) decoder to obtain a first VL decoded data block;

(D) decoding said second data block using said variable length (VL) decoder to obtain a second VL decoded data block;

(E) performing inverse quantization on said first VL decoded data block to obtain a first dequantized data block;

(F) performing inverse quantization on said second VL decoded data block to obtain a second dequantized data block;

(G) transforming said first dequantized data block using an inverse cosine discrete (IDCT) function; and (H) transforming said second dequantized data block using said inverse cosine discrete (IDCT) function, wherein, said steps of decoding said second data block and performing inverse quantization on said second VL decoded data block are preformed in parallel with said step of transforming said first dequantized data block, and wherein, said steps of transforming said first dequantized data block and said second dequantized data block comprise machine executed partitioned multiplication and addition operations that process a plurality of word components in parallel.

10. A computer program product having a computer usable medium including a computer readable code embodied therein for causing decompression of compressed digital video, said computer program product comprising:

computer readable program code devices configured to parse a bitstream of compressed digital video to identify bitstream parameters and to divide the bitstream into blocks of data including a first data block and a second data block, said second data block subsequent to said first data block;

computer readable program code devices configured to motion compensate said blocks of data;

computer readable program code devices configured to decode said first data block using a variable length (VL) decoder to obtain a first VL decoded data block;

computer readable program code devices configured to decode said second data block using said variable length (VL) decoder to obtain a second VL decoded data block;

computer readable program code devices configured to perform inverse quantization on said first VL decoded data block to obtain a first dequantized data block;

computer readable program code devices configured to perform inverse quantization on said second VL decoded data block to obtain a second dequantized data block;

computer readable program code devices configured to transform said first dequantized data block using an inverse cosine discrete transform (IDCT) function, said transformation of said first VL decoded data block performed in parallel with said decoding of said second data block and said inverse quantization of said second VL decoded data block; and computer readable program code devices configured to transform said second dequantized data block using said inverse cosine discrete transform (IDCT) function, wherein, said IDCT function comprises machine executed partitioned multiplication and addition operations that process a plurality of word components in parallel.

* * * * *